United States Patent Office 2,779,632
Patented Jan. 29, 1957

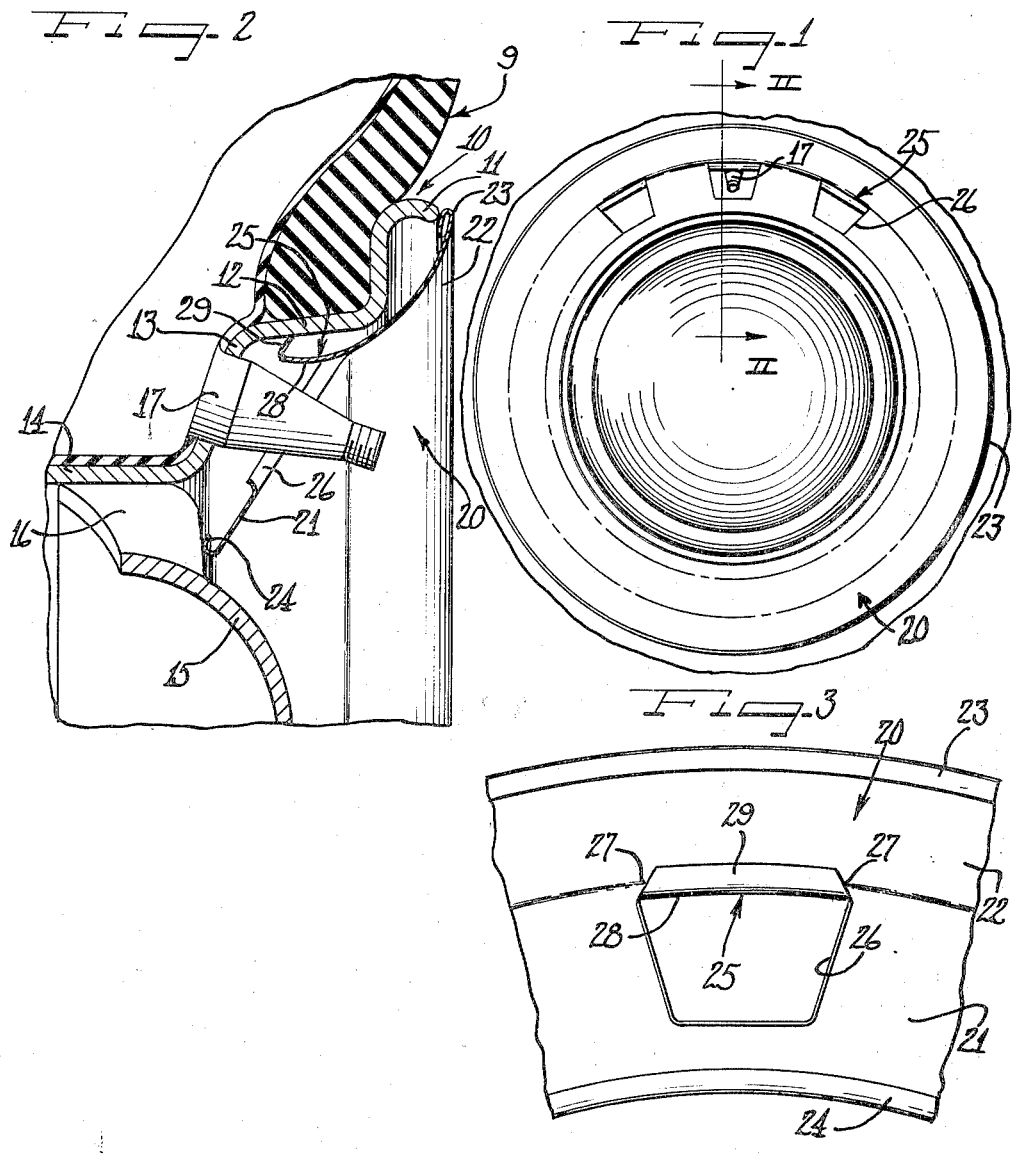

2,779,632

WHEEL COVER

George Albert Lyon, Detroit, Mich.

Application October 12, 1953, Serial No. 385,472

3 Claims. (Cl. 301—37)

This invention relates to a wheel cover and more particularly to an automobile wheel cover for disposition over the outer side of a wheel.

An object of this invention is to provide a wheel cover with retaining fingers deflected therefrom in such manner as to provide ornamental openings in the cover.

Another object of this invention is to provide automobile wheel trim having self-contained retaining means and which lends itself to economical manufacture on a large production scale.

A further object of the invention is to provide in a wheel structure a cover having novel self-retaining finger structure engageable with a rim flange of the wheel.

Other objects and features of this invention may more fully appear from the following detailed description taken in connection with the accompanying drawings which illustrate several embodiments thereof and in which—

Figure 1 is a fragmentary front view of a wheel having an ornamental cover or trim ring applied thereto embodying the features of this invention;

Figure 2 is an enlarged fragmentary cross-sectional view taken on substantially the line II—II of Figure 1 looking in the direction indicated by the arrows; and Figure 3 is a fragmentary view of a portion of the cover or trim ring showing the wedge-shaped contour of the finger deflected from the wedge-shaped opening in the cover.

The reference character 9 designates generally a pneumatic tire and tube assembly mounted in the customary way upon a conventional drop-center type of multi-flanged tire rim 10. This rim 10 includes a terminal flange 11, generally axial and radial flanges 12 and 13, and a base flange 14.

Attached to the base flange 14 at spaced intervals and in a conventional manner is a wheel body or load supporting member 15 having the usual transverse wheel openings 16. The tire and tube assembly has the customary outwardly extending valve stem 17.

Cooperable with this wheel is a wheel cover or trim ring embracing the features of this invention and which is designated generally by the reference character 20. It may be made from any suitable sheet material although it is preferably made from steel sheet, such, for example, as stainless steel strip. This cover, as well as the modified form 30 shown in Figure 4, lends itself to cheap manufacture in standard punch press equipment. Also, by virtue of it being made of stainless steel, it can be economically provided with a highly lustrous external finish by simple buffing operations.

The cover or trim ring 20 includes an inner radial flat portion 21 and an outer convexly curved portion 22 terminating in a turned reinforcing and pry-off edge 23. The inner periphery of this ring 20 may be suitably reinforced by likewise providing it with a turned edge 24.

Deflected or punched from the intermediate annular area of the cover are a plurality of angular cover retaining spring fingers 25, embodying the features of this invention, and which leave spaced flange openings 26. Each of these openings, as shown in Figures 1 and 2, is generally of a wedge-shape or, in other words, is defined by converging side edges. Thus, the resilient spring finger 25, by virtue of it being punched from the wedge-shaped opening, is likewise of a generally wedge-shape or, in other words, has converging side edges as indicated by the reference numeral 27 in Figure 3.

The angular finger includes an axially rearwardly extending leg 28 and a comparatively shorter axially and radially inclined leg 29 terminating in a gripping edge for sliding and resilient cam-like gripping engagement with the inclined axial rim flange 12.

It will be noted that each of the fingers is deflected from a radially outer edge of the flanged opening 26 with the axial legs 28 of the fingers comprising axially rearward curved extensions of the outer curved cover portion 22, with the curve of each symmetrically merging into and comprising a continuation of the curve of the radially outer cover portion 22, and that the angular leg or extremity 29 extends radially beyond the opening 26. Also, the extremities of the shorter legs 29 of the spring fingers 25 are arranged in a generally common circle of a diameter slightly less than that of the inner surface of axial rim flange 12 so as to require resilient flexure and stressing of the fingers as they are pressed into gripping engagement with the rim flange 12.

Attention is also directed to the fact that one of the wheel openings 26 can be utilized to provide an opening through which the valve stem 17 can project as shown in Figure 2.

The cover 20, in the particular embodiment shown, is in the form of an annulus and when on the wheel has at least one of its turned edges 23—24 in contact with a portion of the wheel so as to eliminate axial movement of the cover into the wheel. In addition, one of these turned edges, by reason of its reinforcement, could be employed as a pry-off edge for engagement by a suitable pry-off tool for removing the cover or trim ring from the wheel.

The wedge-shaped openings 26 not only serve to ornament the cover but, in addition, may be used as air circulating openings if it is so desired and in which event air would circulate between the openings 26 and the wheel openings 16.

The cover 20 is applied to the outer side of the wheel by first aligning the fingers 25 with the opening in the rim defined by the flange 12. Thereafter, the cover is pressed axially inwardly into the wheel causing the extremities of the short angular legs 29 to be resiliently cammed radially inwardly by engagement with the inclined axial surface of flange 12 thereby resiliently stressing the finger. This results in the spring fingers resiliently and detachably holding the cover or annulus on the wheel. Moreover, as noted before, at least one of the reinforced turned edges of the annulus contacts a part of the wheel, such as the terminal flange 11, and thus limits the axial movement of the cover into the wheel. That is to say, the cover bottoms on the wheel at least at one of its edges.

The converging side edge structure of each of the spring fingers 25 results in the finger having maximum rigidity at its connection with the edge of the opening in the cover and provides the angular leg 29 with a lesser mass of metal so that the finger can progressively yield in response to camming engagement with the rim flange.

Removal of the cover is easily effected by inserting a pry-off tool under one of the turned edges of the cover and by forcibly ejecting the cover and its spring fingers from gripping engagement with the rim flange 12.

I claim as my invention:

1. In a wheel structure including a wheel having a multi-flanged tire rim, one of which flanges extends generally axially, a wheel cover comprising a circular member having a radially outer portion of generally convexly curved cross-section and having spaced cover retaining fingers deflected axially rearwardly from an intermediate portion of the member leaving spaced openings in said member, each of said fingers being generally of an angular cross-section with a radially inner axial leg connected to said member and a radially outer relatively shorter leg inclined radially and axially outward and terminating in a gripping edge adapted to engage said rim axial flange, each of said fingers extending from a radially outer edge of one of said openings and with its gripping edge radially outwardly beyond the opening, said axial legs of said fingers comprising axially rearward curved extensions of said outer curved cover portion with the curve of each symmetrically merging into and comprising a continuation of the curve of said radially outer cover portion.

2. A wheel structure as defined in claim 1 wherein the axial legs of the fingers include converging side edge structure resulting in the fingers having maximum rigidity at connection with the outer curved cover portion.

3. A wheel structure as defined in claim 1 wherein the spaced openings are of generally wedge shape with the widest dimension at juncture of the axial legs with the cover, and the wheel has a valve stem that projects through one of the openings.

References Cited in the file of this patent

UNITED STATES PATENTS

| | | |
|---|---|---|
| 2,198,056 | Lyon | Apr. 23, 1940 |
| 2,345,283 | Mulhern | Mar. 28, 1944 |
| 2,358,468 | Mulhern | Sept. 19, 1944 |
| 2,368,228 | Lyon | Jan. 30, 1945 |
| 2,368,237 | Lyon | Jan. 30, 1945 |
| 2,368,238 | Lyon | Jan. 30, 1945 |
| 2,383,071 | Mulhern | Aug. 21, 1945 |
| 2,386,233 | Lyon | Oct. 9, 1945 |